United States Patent [19]
Lee et al.

[11] Patent Number: 5,958,474
[45] Date of Patent: Sep. 28, 1999

[54] PROCESS FOR PREPARING FOOD FLAVOR PRECURSORS

[75] Inventors: Eldon Chen-Hsiung Lee, New Milford; Elaine R. Wedral, Sherman, both of Conn.

[73] Assignee: Nestec S.A., Vevey, Switzerland

[21] Appl. No.: 08/697,222

[22] Filed: Aug. 21, 1996

[51] Int. Cl.$^6$ ........................................................ A23B 7/10
[52] U.S. Cl. .................................. 426/50; 426/49; 426/52
[58] Field of Search ................................. 426/50, 48, 49, 426/52, 534, 650

[56] References Cited

U.S. PATENT DOCUMENTS

| | | | |
|---|---|---|---|
| 3,615,721 | 10/1971 | Silberman | 426/50 |
| 3,666,487 | 5/1972 | Yokotsuka et al. | 426/50 |
| 3,711,302 | 1/1973 | Mitchell et al. | |

FOREIGN PATENT DOCUMENTS

| | | | |
|---|---|---|---|
| 3068062 | 3/1987 | Japan | 426/50 |

OTHER PUBLICATIONS

Dorreich, K. A., EPO Abstracts, abstracting GB 02139471A, Nov. 1984.

R.F. Schwan et al., (1995) "Microbial fermentation of cocoa beans, with emphasis on enzymatic degradation of the pulp", *Journal of Applied Bacteriology Symposium, Supplement*, vol. 79, pp. 96S–107S.

*Primary Examiner*—Leslie Wong
*Attorney, Agent, or Firm*—Pennie & Edmonds LLP

[57] ABSTRACT

A process for preparing food flavor precursors which includes enzymatically hydrolyzing fruit pulp fibers with a pectolytic enzyme and a process for the preparation of a food flavor which includes mixing the ingredients of the food flavor with from 1 to 5% of the food flavor precursor thus prepared.

20 Claims, No Drawings

PROCESS FOR PREPARING FOOD FLAVOR PRECURSORS

FIELD OF THE INVENTION

The present invention relates to the production of flavoring agents, more particularly to a process for preparing flavor precursors from fruit pulp fibers.

BACKGROUND OF THE INVENTION

Fruit pulp fibers contain pectin and cellulosic materials such as hemicellulose. Pectin is present in the cell walls of all plant material and functions, in combination with cellulosic material, as an intercellular cementing material. The main component of pectin is a linear D-galacturonan, many of the carboxyl groups of which are esterified with methanol. Other components include L-arabinan and D-galactan which together may form up to 20% by weight of the pectin. The main raw materials for pectin and hemicellulose are the peel of citrus fruits such as lemon, lime, orange and grapefruit, as well as apple pomace which is the residue remaining after pressing of apple to obtain apple juice.

SUMMARY OF THE INVENTION

Galacturonic acids and reducing sugars such as glucose, arabinose and galactose are known as flavor precursors and we have surprisingly found that such substances may be obtained by enzymatically hydrolyzing fruit pulp fibers.

The present invention provides a process for preparing food flavor precursors which comprises enzymatically hydrolyzing fruit pulp fibers with a pectolytic enzyme.

DETAILED DESCRIPTION OF THE INVENTION

The fruit pulp fibers used in the process of the present invention may be citrus pulp which may be dehydrated and ground, citrus pectin or apple pulp fiber which comprises primarily apple pomace which is the by-product of juice processing.

The pectolytic enzyme may be, for instance, polygalacturonase, pectinesterase, hemicellulase and pectintranseliminase or any mixture of two or more thereof, and more particularly a pectolytic enzyme preparation containing a mixture of the above enzymes.

Novo Pectinex 3X-L is a liquid pectolytic enzyme preparation with an enzyme activity of 3,000 FDU 55° C./ml (determined by measuring the depectinisation of apple juice) based on Novo standard activity determination. It is a highly purified preparation produced from a selected strain of *Aspergillus niger*. The product mainly contains pectintranseliminase, polygalacturonase, pectinesterase and hemicellulase. The optimum pH and temperature for pectinase activity are approximately 4.5 and 50° C., respectively. The optimum pH for pectinase stability at 50° C. is approximately 3 to 5.

Novo Pectinex Ultra SP-L is a highly active pectolytic enzyme preparation with an enzyme activity of 26,000 PG/ml (determined by the measurement of the reduction of the viscosity of a solution of pectic acid at 20° C. and at pH 3.5). It is produced from a selected strain of the Aspergillus niger group. This enzyme preparation contains pectolytic and a range of hemicellulytic activities.

The citrus pectin hydrolysate may be produced by hydrolyzing citrus pectin, e.g. as an aqueous slurry having a dry solids content from 5–50%, preferably from 10–25% by weight with any one or more of the above pectolytic enzymes at a pH of from 4 to 6, a temperature of from 40° to 60° C. for a period of time from 6 to 48 hours, e.g. the enzymatic hydrolysate of USP grade citrus pectin with Novo Pectinex or Novo Pectinex Ultra SP-L derived from a selected strain of *Aspergillus niger* at pH 4.5 and 50° C. for 24 hours, to give mono-, di-, and tri-galacturonic acids as well as some L-arabinose and D-galactose.

The citrus pulp hydrolysate or apple pulp may be produced by hydrolyzing citrus pulp with any one or more of the above pectolytic enzymes as well as a cellulase at a pH of from 4 to 6, a temperature of from 40° to 60° C. for a period of time from 6 to 48 hours, e.g. the enzymatic hydrolysis of citrus pulp with Novo Pectinex or Novo Pectinex Ultra SP-L derived from A.Niger and the cellulase, Novo Celluclast 1.5 L derived from Trichoderma reesei at pH 4.5 and 50° C. for 24 hours gives products of mono-, di-, and tri-galacturonic acids as well as L-arabinose, D-glucose, D-galactose, and D-cellobiose. The citrus pulp may be used as an aqueous slurry having a dry solids content of from 2.5 to 25% and preferably from 5 to 20% by weight.

Celluclast 1.5 L is a liquid cellulase preparation with an enzyme activity of 1,500 NCU/g. One Novo Cellulase Unit (NCU) is the amount of enzyme which, under standard conditions, degrades carboxymethylcellulose to reducing carbohydrates with a reduction power corresponding to 1 $\mu$mol glucose per minute. It is made by submerged fermentation of a selected strain of the fungus Trichoderma reesei. The enzyme catalyzes the breakdown of cellulose into glucose, cellobiose and higher glucose polymers. The optimum pH and temperature for cellulase activity are approximately 4.5–5.5 and 50–65° C., respectively. The influence of pH and temperature on the optimum stability of cellulase are 4–7 and up to 50° C. respectively.

The enzymes may be used in varying concentrations with respect to the citrus pectin or citrus pulp, e.g. from 0.5 to 2% (v/w).

If desired, the citrus pulp may be hydrolyzed with an acid e.g. HCl, before the enzymatic hydrolysis. The acid hydrolysis may be carried out at a temperature from 80° to 100° C., preferably 85° to 95° C. for a period of from 1 to 10 hours, preferably from 4 to 8 hours using an aqueous slurry of the citrus pulp having a dry solids content of from 2.5 to 25% and preferably from 5 to 20% by weight. After the acid hydrolysis, the citrus pulp may be neutralized to from pH 4 to 6, preferably from 4.5 to 5.5 with sodium hydroxide.

After the enzymatic hydrolysis, the hydrolyzed materials may be treated to inactivate the enzymes, e.g. by heating to a temperature from 80° to 100° C. for a period of time from 5 to 30 minutes, conveniently from 10 to 20 minutes.

The fruit pulp fibers are preferably used in a powdered form for the hydrolysis, preferably a fine powder having an average particle size of from 45 to 2000 microns.

After the enzymatic hydrolysis, the hydrolysates may be dried, e.g. by spray drying to give a powder. Preferably, an anti-caking or anti-sticking agent such as silicon dioxide or a maltodextrin, e.g. maltodextrin 10 DE (10 dextrose equivalents) may be added for the spray-drying.

The fruit pulp hydrolysates prepared in accordance with the process of the present invention may be used as flavor precursors for reaction flavor development such as meat flavors, coffee, chocolate and other food flavors as well as pet food flavors.

The present invention, therefore, also provides a food flavor comprising an effective flavoring amount of a fruit pulp hydrolyzate prepared in accordance with the process of the present invention, e.g. an amount of from 1 to 5%, preferably from 2 to 4% and especially from 2.5 to 3.5% by weight based on the total weight of the food flavor.

EXAMPLES

The following Examples further illustrate the present invention. Parts are given by weight unless otherwise indicated. Parts by weight bear the same relation to parts by volume as do kilograms to liters.

Example 1

To a mixture of 24,000 parts of water, 120 parts by volume of Pectinex 3X-L and 120 parts by volume of Pectinex Ultra SP-L are added stepwise 6000 parts of citrus pectin. 1,530 parts of a 50% solution of NaOH are added to control the pH at 4.5 and enzymatic hydrolysis takes place at 50° C. for 24 hours.

After the hydrolysis, the enzymes are inactivated by heating the mixture at 95° C. for 15 minutes followed by cooling to 25° C. The mixture is then spray dried in a Niro atomizer at an inlet temperature of 150° C. and an outlet temperature of 90° C. to give a powdered flavor precursor. The liquid chromatographic analysis of the flavor precursor is given in Table 1.

Example 2

To a mixture of 27000 parts of water, 60 parts by volume of Pectinex 3X-L, 60 parts by volume of Pectinex Ultra SP-L and 60 parts by volume of Celluclast 1.5 L are added stepwise 3000 parts of citrus pulp cells obtained from Freeman Industries Inc. prepared from the albedo which is the white spongy, inner part of the peel and which has been washed, dehydrated and ground. 480 parts of a 50% solution of NaOH are added to control the pH at 4.5 and enzymatic hydrolysis takes place at 50° C. for 24 hours.

After the hydrolysis, the enzymes are inactivated by heating the mixture at 950° C. for 15 minutes followed by cooling to 25° C. The mixture is then spray dried in a Niro atomizer at an inlet temperature of 150° C. and an outlet temperature of 90° C. to give a powdered flavor precursor. The liquid chromatographic analysis of the flavor precursor is given in Table 1.

Example 3

27000 parts 0.1N HCl are added to 3000 parts of citrus pulp cells (similar to that used in Example 2 and hydrolyzed at pH 2.0 at 90° C. for 6 hours. 50% NaOH is added to the hydrolysed product to adjust the pH to 4.5 and then 60 parts by volume of Pectinex 3X-L, 60 parts by volume of Pectinex Ultra SP-L and 60 parts by volume of Celluclast 1.5 L are added. Enzymatic hydrolysis takes place at 50° C. for 24 hours while 50% NaOH is added to control the pH at 4.5.

After the hydrolysis, the enzymes are inactivated by heating the mixture at 95° C. for 15 minutes followed by cooling to 25° C. The mixture is then spray dried in a Niro atomizer at an inlet temperature of 150° C. and an outlet temperature of 90° C. to give a powdered flavor precursor. The liquid chromatographic analysis of the flavor precursor is given in Table 1.

TABLE 1

| COMPONENT | EXAMPLE 1 | EXAMPLE 2 | EXAMPLE 3 |
|---|---|---|---|
| Mono-galacturonic acid | 27.11 | 10.27 | 16.30 |
| Di-galacturonic acid | 3.62 | 0.16 | 0.50 |
| Tri-galacturonic acid | 43.00 | 22.60 | 20.10 |
| D-Glucose | | 4.90 | 5.05 |
| L-Arabinose | 1.32 | 1.20 | 11.05 |
| D-Galactose | 1.36 | 4.30 | 5.18 |
| D-Cellobiose | | 13.38 | 6.58 |
| Moisture* | 3.70 | 3.74 | 3.00 |
| Insoluble Matters* | 19.89 | 39.45 | 32.24 |
| Total | 100.00 | 100.00 | 100.00 |

*All samples were extracted by adding 100 ml water to 1 gram of sample for the HPLC analysis and insoluble matters are calculated by the difference.

Examples 4, 5 & 6 & Comparative Examples A & B

Beef flavors are prepared from the ingredients shown in the following Table 2.

TABLE 2

| | EXAMPLES | | | | |
|---|---|---|---|---|---|
| Ingredients | A | B | 4 | 5 | 6 |
| HPP 4BE Powder | 30.0 | 30.0 | 30.0 | 30.0 | 30.0 |
| Special Light Yeast Powder | 5.0 | 5.0 | 5.0 | 5.0 | 5.0 |
| Monsodium Glutamate | 2.7 | 2.7 | 2.7 | 2.7 | 2.7 |
| Thiamine Hydrochloride | 0.5 | 0.5 | 0.5 | 0.5 | 0.5 |
| L-cysteine Hydrochloride | 0.8 | 0.8 | 0.8 | 0.8 | 0.8 |
| Dextrose | 1.2 | 1.2 | 1.2 | 1.2 | 1.2 |
| Xylose | 1.2 | — | — | — | — |
| DPP | — | 3.0 | — | — | — |
| Pectin Hydrolysate of Example 1 | — | — | 3.0 | — | — |
| Pulp Hydrolysate of Example 2 | — | — | — | — | 3.0 |
| Pulp Hydrolysate of Example 3 | — | — | — | 3.0 | — |
| Water | 100.0 | 100.0 | 100.0 | 100.0 | 100.0 |
| Maltodextrin | 60.0 | 60.0 | 60.0 | 60.0 | 60.0 |
| Total | 201.4 | 203.2 | 203.2 | 203.2 | 203.2 |

All the above ingredients except maltodextrin are added in a pressure vessel and mixed to ensure maximum solubility. The mixture is heated to 120° C. and maintained at 120° C. for 2 hours. The mixture is then cooled to 50° C. and homogenized with maltodextrin and then finally spray dried in a Niro atomizer at an inlet temperature of 150° C. and an outlet temperature of 90° C. to give powdered beef flavors.

The beef flavors of Examples 4, 5 and 6 containing flavor precursors of Examples 1, 2 and 3 of the present invention respectively were more intense than the beef flavor of Comparative Example A where xylose was used as flavor precursor and were similar to the beef flavor of Comparative Example B using DPP—a commercially available depolymerised pectin.

What is claimed is:

1. A process for preparing food flavor precursors, which comprises enzymatically hydrolyzing fruit pulp fibers with a pectolytic enzyme at a concentration of about 0.5 to 2% (v/w) with respect to the fruit pulp, at a pH from 4 to 6 and a temperature from 40° to 60° C. for a period of time from 6 to 48 hours to form the flavor precursor having a saccharide content of between 56.8 and 76.4 percent by weight.

2. The process according to claim 1 wherein the hydrolysis is conducted with a mixture of pectolytic enzymes.

3. The process according to claim 1 wherein the hydrolysis is conducted with the pectolytic enzyme in combination with a cellulase.

4. The process according to claim 1 wherein the fruit pulp fiber is citrus pulp, citrus pectin, or apple pulp fiber.

5. The process according to claim 1 wherein the pectolytic enzyme is polygalacturonase, pectinesterase, hemicellulase, or pectintranseliminase.

6. The process according to claim 4 wherein the citrus pectin is used as an aqueous slurry having a dry solids content of 5 to 50 weight percent.

7. The process according to claim 4 wherein the fruit pulp fibers are used as an aqueous slurry having a dry solids content of from 2.5 to 25 weight percent.

8. The process according to claim 1 wherein the pectolytic enzyme is used in an amount of from 0.5 to 2 percent volume/weight with respect to the fruit pulp fiber.

9. The process according to claim 1 which further comprises inactivating the pectolytic enzyme after the enzymatic hydrolysis.

10. The process according to claim 1 which further comprises drying the food flavor precursors after enzymatic hydrolysis.

11. The process according to claim 10 wherein the food flavor precursors are dried to a powder.

12. A process for preparing a food flavor precursor, which comprises:

hydrolyzing citrus pulp fiber with an acid; and enzymatically hydrolyzing the citrus pulp fiber after the acid hydrolysis with a pectolytic enzyme at a concentration of about 0.5 to 2% (v/w) with respect to the fruit pulp fiber and at a pH from 4 to 6 and a temperature from 40° to 60° C. for a period of time from 6 to 48 hours to form the food flavor precursor having a saccharide content of between 56.8 and 76.4 percent by weight.

13. The process according to claim 12 wherein the acid hydrolysis occurs at a temperature from 80° to 100° C. for a period of from 1 to 10 hours.

14. The process according to claim 12 wherein the citrus pulp fibers are used in an aqueous slurry having a dry solids content of from 2.5 to 25 weight percent.

15. The process according to claim 12 which further comprises neutralizing the citrus pulp fibers to a pH of from 4 to 6 after the acid hydrolysis.

16. The process according to claim 12 wherein the enzymatic hydrolysis is conducted with a mixture of pectolytic enzymes.

17. The process according to claim 12 wherein the enzymatic hydrolysis is conducted with the pectolytic enzyme in combination with a cellulase.

18. The process according to claim 12 which further comprises inactivating the pectolytic enzyme after the enzymatic hydrolysis.

19. The process according to claim 12 which further comprises drying the food flavor precursors after enzymatic hydrolysis.

20. The process according to claim 19 wherein the food flavor precursors are dried to a powder.

* * * * *